(12) United States Patent
Infante et al.

(10) Patent No.: US 7,307,948 B2
(45) Date of Patent: Dec. 11, 2007

(54) SYSTEM WITH MULTIPLE PATH FAIL OVER, FAIL BACK AND LOAD BALANCING

(75) Inventors: Jon L. Infante, Huntington Beach, CA (US); Mark J. Karnowski, Huntington Beach, CA (US); Christopher Carlin, Laguna Nigel, CA (US); David C. Lawson, Richardson, TX (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 191 days.

(21) Appl. No.: 10/278,189

(22) Filed: Oct. 21, 2002

(65) Prior Publication Data

US 2004/0078632 A1 Apr. 22, 2004

(51) Int. Cl.
*G01R 31/08* (2006.01)
*G06F 11/00* (2006.01)
*G06F 15/16* (2006.01)
*G06F 3/00* (2006.01)
*H04L 1/00* (2006.01)
*H04L 12/28* (2006.01)
*H04L 12/56* (2006.01)

(52) U.S. Cl. ............... 370/225; 370/419; 709/219; 710/38; 714/4

(58) Field of Classification Search .......... 370/225, 370/237, 419–420; 709/239; 710/38; 714/4
See application file for complete search history.

(56) References Cited

U.S. PATENT DOCUMENTS

| | | | | |
|---|---|---|---|---|
| 5,918,021 A | * | 6/1999 | Aditya | 709/235 |
| 6,314,525 B1 | * | 11/2001 | Mahalingham et al. | 714/4 |
| 6,393,483 B1 | * | 5/2002 | Latif et al. | 709/226 |
| 6,434,620 B1 | * | 8/2002 | Boucher et al. | 709/230 |
| 6,490,632 B1 | * | 12/2002 | Vepa et al. | 709/250 |
| 6,578,158 B1 | * | 6/2003 | Deitz et al. | 714/11 |
| 6,594,227 B1 | * | 7/2003 | Ogawa et al. | 370/216 |
| 6,625,747 B1 | * | 9/2003 | Tawil et al. | 714/6 |
| 6,711,574 B1 | * | 3/2004 | Todd et al. | 707/100 |
| 2002/0040411 A1 | * | 4/2002 | Iwatani et al. | 710/2 |
| 2002/0083174 A1 | * | 6/2002 | Hayashi et al. | 709/225 |
| 2002/0161871 A1 | * | 10/2002 | Shanthaveeraiah et al. | 709/223 |
| 2002/0169842 A1 | * | 11/2002 | Christensen et al. | 709/206 |
| 2003/0126315 A1 | * | 7/2003 | Tan et al. | 710/1 |
| 2003/0200477 A1 | * | 10/2003 | Ayres | 714/2 |
| 2004/0054866 A1 | * | 3/2004 | Blumenau et al. | 711/202 |

* cited by examiner

Primary Examiner—Kevin C. Harper
(74) Attorney, Agent, or Firm—Morrison & Foerster LLP

(57) ABSTRACT

A system comprising a host system, a driver in communication with a host system, and a plurality of host bus adapters in communication with the driver. The host bus adapters provide a plurality of data transmission paths between the host system and a storage device. The driver is operable to adjust data transmission loads between the paths without burdening the operating system.

70 Claims, 6 Drawing Sheets

SYSTEM WITH MULTIPLE PATH FAIL OVER, FAIL BACK AND LOAD BALANCING

BACKGROUND

Load balancing is a software technique that balances amounts of data sent over different network segments, such that the aggregate transmission rate may be maximized.

Fail over and fail back are techniques to redirect data transmissions over network segments after detecting a segment failure (e.g., line outages, damage, etc.). "Fail over" refers to switching from a primary network segment to a secondary network segment when a problem is detected on the primary segment. "Fail back" refers to reconnecting the primary segment after the failure has been corrected.

SUMMARY

Techniques for load balancing, fail over and fail back have generally been performed at a host computer operating system level. These techniques burden the host computer and have a slow reaction time to dynamic changes in traffic levels on the network segments. Further, as modern operating systems attempt to isolate application layers from the specifics of low level protocols, it becomes more and more difficult for application-layer-based fail over schemes to make appropriate decisions. These techniques may also have a slower reaction time to failures and repairs of network segments.

The present application relates to a system with intelligent host bus adapters (HBAs) that are directly connected to network segments. These HBAs may have several advantages and functions.

For example, these HBAs may intelligently monitor segment performance (e.g., segment data transmission loading levels) and detect segment failures and repairs. These HBAs may also react to segment failures by selectively redirecting data transmissions for fail over to one or more alternate segments. When the segment is repaired, the HBA may react by failing back to the original segment. In conjunction with or apart from fail over and fail back, these HBAs may balance transmission loads so that aggregate data throughput is increased or maximized. These HBAs may perform these functions quickly in real time without wasting data transmission time on the network and without burdening the host computer.

Networks of computers using these intelligent host bus adapters (with fail over, fail back and load balancing features) may transfer data with higher aggregate speed because each adapter may respond in a more timely manner to network segment failures, repairs and loading levels.

These intelligent host bus adapters may have driver software equipped with fail over, fail back and load balancing features. The host bus adapter driver software may use feedback of operating conditions from a switch fabric to automatically and dynamically adjust the behavior of one or more bus adapters, without requiring dynamic intervention from the host computer operating system.

A system administrator may set up one or more host bus adapters as fault tolerant data connections to Fibre Channel devices. The system may provide mission critical features and data robustness.

One aspect of the application relates to a system comprising an operating system; a driver in communication with the operating system; and a plurality of host bus adapters in communication with the driver. The host bus adapters provide a plurality of data transmission paths between the operating system and a storage device. The driver is operable to change data transmission from a primary path to a secondary path without burdening the operating system.

Another aspect relates to a system comprising an operating system; a driver in communication with the operating system; and a plurality of host bus adapters in communication with the driver. The host bus adapters provide a plurality of data transmission paths between the operating system and a storage device. The driver is operable to adjust data transmission loads of the transmission paths without burdening the operating system.

Another aspect relates to a software driver in communication with an operating system and a plurality of host bus adapters. The host bus adapters provide a plurality of data transmission paths between the operating system and a storage device. The driver is operable to change data transmission from a primary path to a secondary path without burdening the operating system.

Another aspect relates to a software driver in communication with an operating system and a plurality of host bus adapters. The host bus adapters provide a plurality of data transmission paths between the operating system and a storage device. The driver is operable to adjust data transmission loads of the transmission paths without burdening the operating system.

Another aspect relates to a switch fabric coupled to a plurality of host bus adapters of an operating system and to a plurality of ports of a target system. The switch fabric comprises a plurality of switches. The switch fabric is operable to detect a data transmission condition and send the data transmission condition to a software driver. The software driver is operable to use the data transmission condition to adjust a data transmission load on at least one path between the driver and ports of the target system without burdening the operating system.

Another aspect relates to a switch fabric coupled to a plurality of host bus adapters of an operating system and to a plurality of ports of a target system. The switch fabric comprises a plurality of switches. The switch fabric is operable to detect a data transmission condition on at least one data transmission path between the host bus adapters and the ports of the target system and adjust a data transmission load of the transmission path without burdening the operating system.

Another aspect of the invention relates to a switch fabric coupled to a plurality of host bus adapters of an operating system and to a plurality of ports of a target system. The switch fabric comprises a plurality of switches. The switch fabric is operable to detect a malfunctioning data transmission path between the host bus adapters and the ports of the target system and adjust data transmission loads of two or more transmission paths without burdening the operating system.

Another aspect relates to a data structure comprising a primary path between a host port and a target port; at least one secondary path between the host port and the target port; a first variable associated with data transmission on the primary path; and a second variable associated with data transmission on a secondary path.

Another aspect relates to a method of transmitting data. The method comprises providing a plurality of data transmission paths between a plurality of host bus adapters of an operating system and a storage device; detecting a failure on a first transmission path between the operating system and the storage device; and changing data transmission between the operating system and storage device from the first transmission path to a second transmission path without burdening the operating system.

Another aspect relates to a method of transmitting data. The method comprises providing a plurality of data transmission paths between an operating system and a storage device by using a plurality of host bus adapters; detecting a data transmission condition on a first transmission path between the operating system and the storage device; and adjusting a data transmission load of the first transmission path without burdening the operating system.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
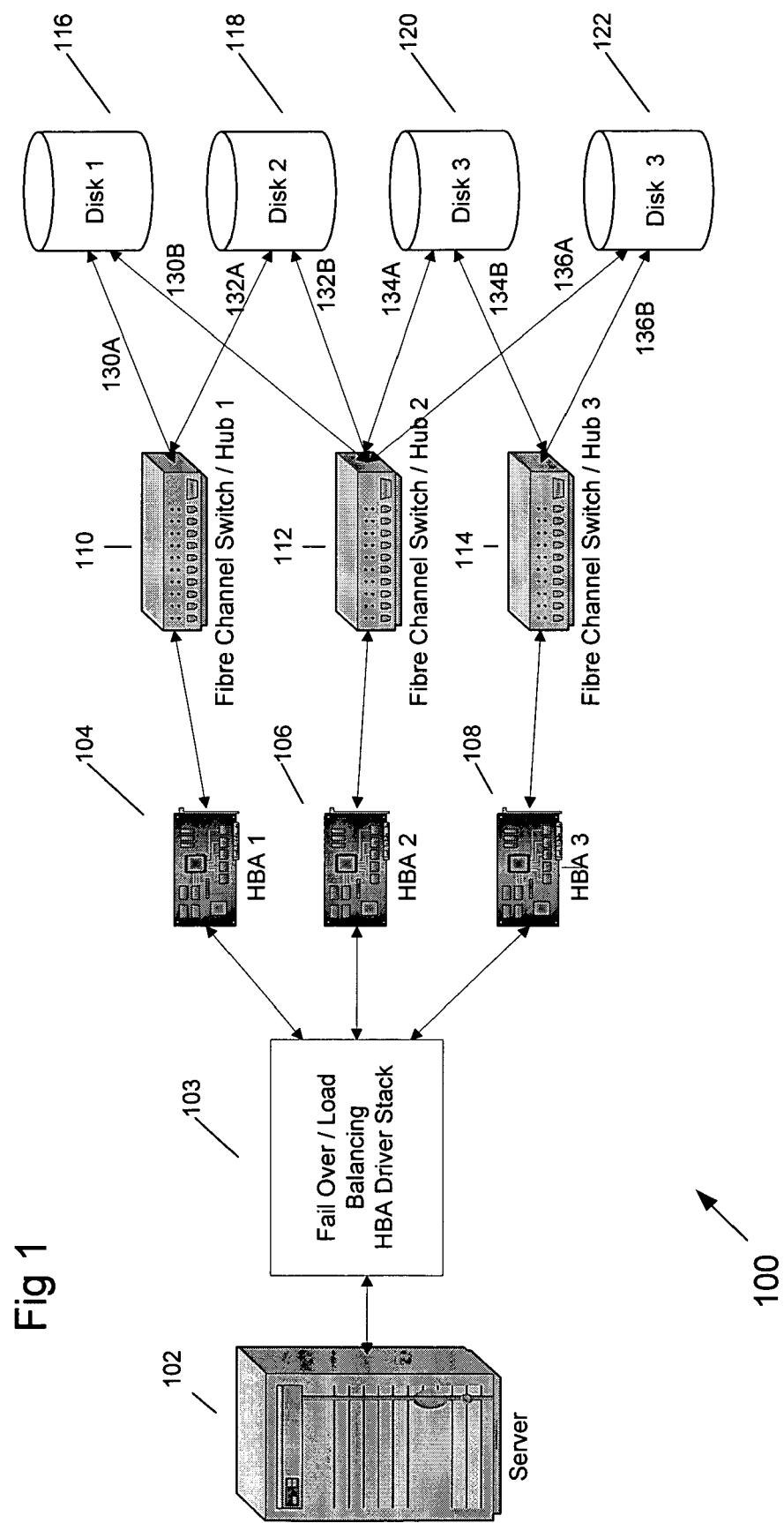
FIG. 1 illustrates one embodiment of a storage area network that is operable to provide fail over, fail back and load balancing.

FIG. 1 illustrates one embodiment of a storage area network 100 that is operable to provide fail over, fail back and load balancing. The system 100 comprises a server 102, which is equipped with a fail over/load balancing HBA software driver stack 103 (hereinafter referred to as the "MultiPulse driver 103" or "driver 103"), a plurality of host bus adapters (HBAs) 104, 106, 108, a plurality of fabric switches or hubs 110, 112, 114 and a plurality of devices 116, 118, 120, 122 (e.g., disk drives). In other embodiments, the system 100 may comprise any number of servers, drivers, HBAs, fabric switches or hubs and devices. In other embodiments, the system 100 may comprise other components in addition to or instead of the components shown in FIG. 1.

The server 102 contains an operating system (e.g., Sun Solaris) that communicates with the devices 116, 118, 120 and 122 by means of the driver 103. The driver 103 provides multiple path fail over, fail back and/or load balancing as described below.

The adapters 104, 106, 108 may be LightPulse® Adapters made by Emulex Corporation of Costa Mesa, Calif.

Figure 2:
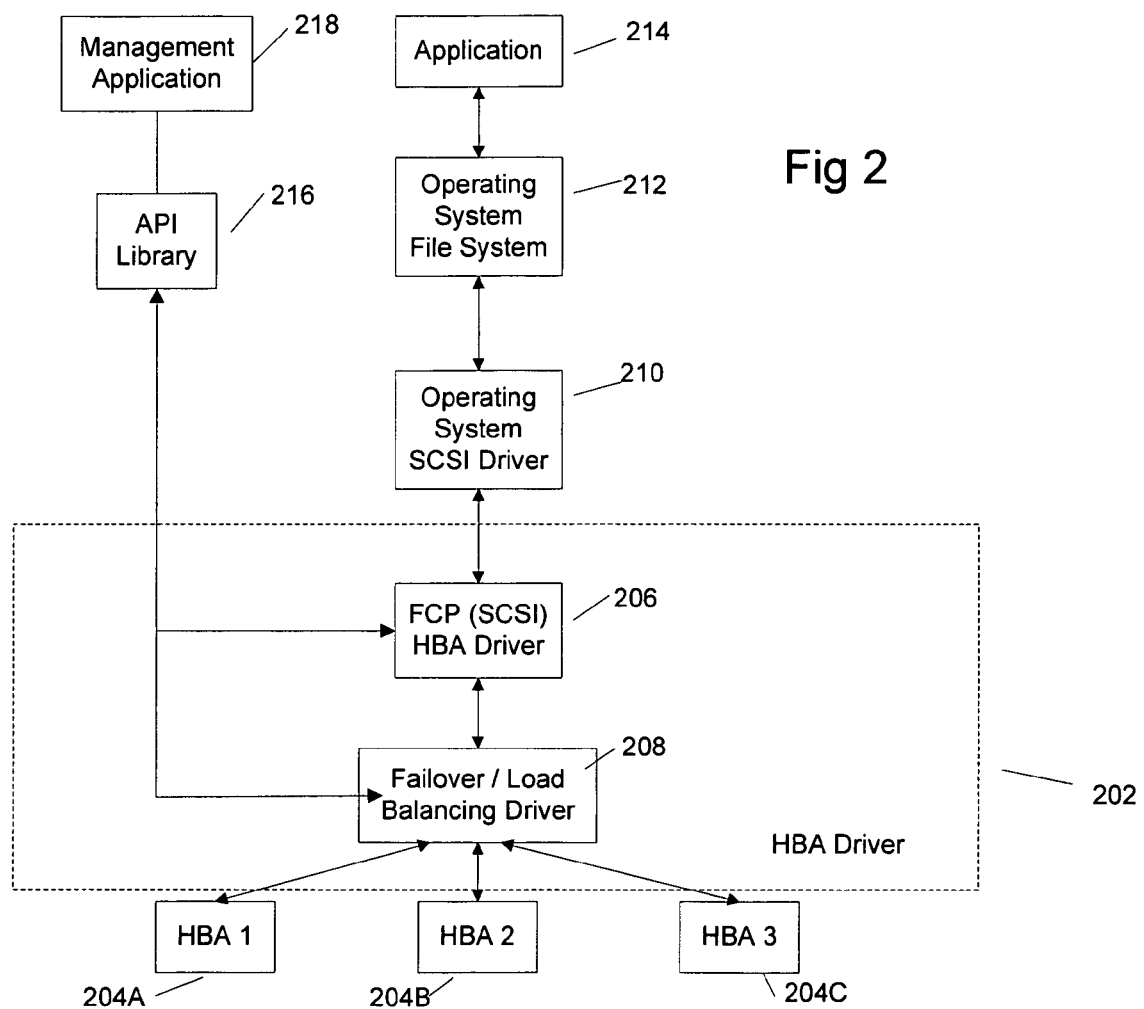
FIG. 2 illustrates one embodiment of a software driver operating with a plurality of host bus adapters and host software.

FIG. 2 illustrates one embodiment of a software driver 202 operating with a plurality of host bus adapters 204A-204C. In one embodiment, the HBAs 204A-204C may be LightPulse HBAs made by Emulex. Although three HBAs 204A-204C are shown in FIG. 2, the system 200 may have any number of HBAs.

The driver 202 may comprise a fail over/load balancing driver module 208 and a Fibre Channel Protocol/Small Computer System Interface (FCP/SCSI) HBA driver module 206. The driver 202 may control multiple HBAs 204A-204C. The driver 202 may operate with an operating system's SCSI driver 210, which may in turn operate with an operating system's file system 212. A software application 214 may operate with the operating system's file system 212. The driver 202 may be operable to provide tail back, fail over and load balancing functions for the adapters 204A-204C.

Also included in the system of FIG. 2 is an Application Program Interface (API) Library 216, which facilitates communication of status and configuration information between a Management Application 218 and the driver modules 206, 208.

The system of FIG. 2 is operable for operating systems that load a single instance of a driver for a plurality of HBAs.

Figure 3:
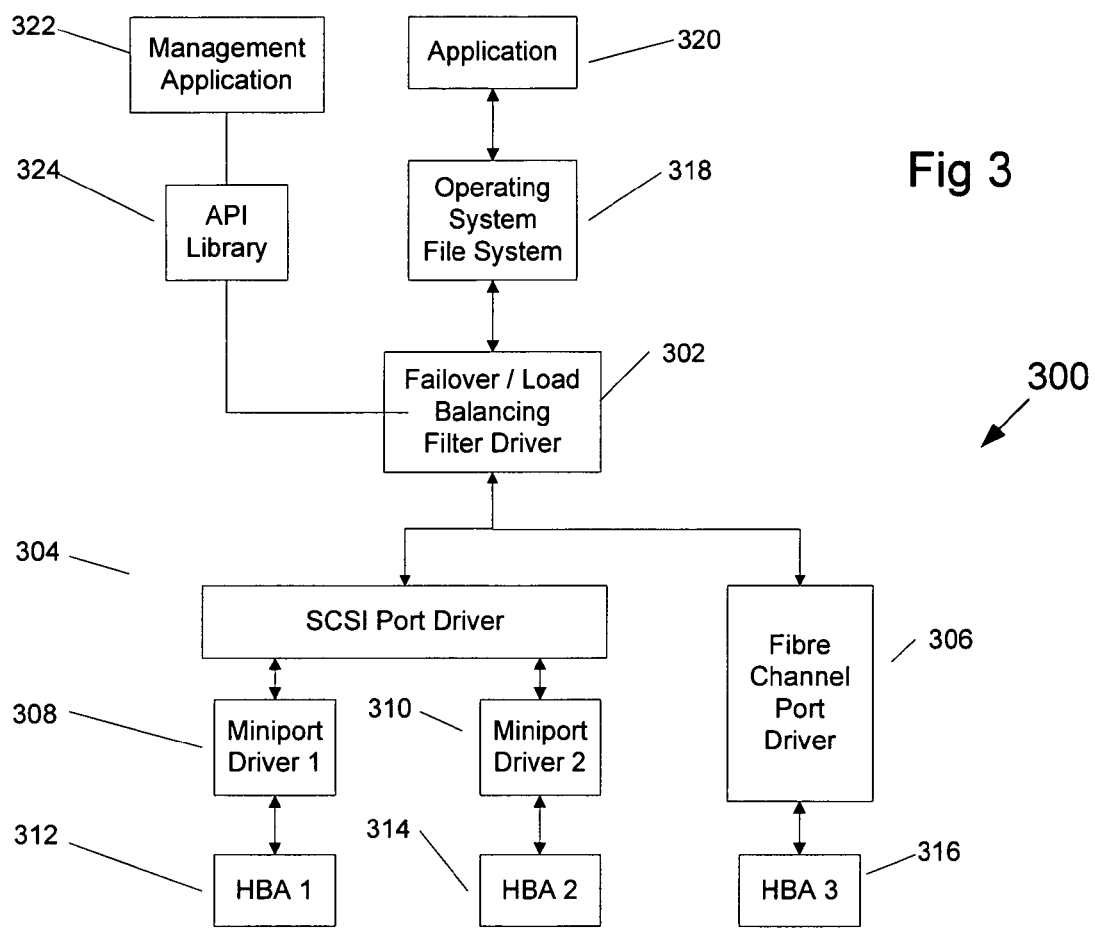
FIG. 3 illustrates another embodiment of a software driver operating with a plurality of host bus adapters and host software.

FIG. 3 illustrates another embodiment of a software driver 302 operating with a plurality of host bus adapters 312-316 and host software. The system 300 of FIG. 3 comprises a fail over/load balancing filter driver 302, a SCSI port driver 304, a plurality of miniport drivers 308-310, a plurality of HBAs 312-316, and a full port driver 306. In one configuration, the SCSI port driver 304 is made by Microsoft Corporation.

The filter driver 302 may be used above the SCSI port driver software 304 to allow the redirection of communications between paths coupled to the HBAs 312 and 314 via miniport drivers 308, 310. Miniport drivers 308 and 310 may convert SCSI commands and status from the SCSI port driver 304 to a form suitable for HBAs 312 and 314. HBAs 312 and 314 may be Fibre Channel or iSCSI adapters.

The HBA 316 may be a Fibre Channel adapter connected to the filter driver 302 through a Fibre Channel port driver 306, which processes file system requests as native Fibre Channel commands for HBA 3 316.

Also included in the system of FIG. 3 is an API Library 324, which facilitates communication of status and configuration information between a Management Application 322 and the filter driver 302.

The system of FIG. 3 is operable for operating systems that load instances of a driver for each HBA. In this case, the individual drivers 306, 308 and 310 have no knowledge of or access to HBAs other than their own. Therefore, a filter driver 302 may be used to reroute I/O traffic to a desired HBA.

Figure 4:
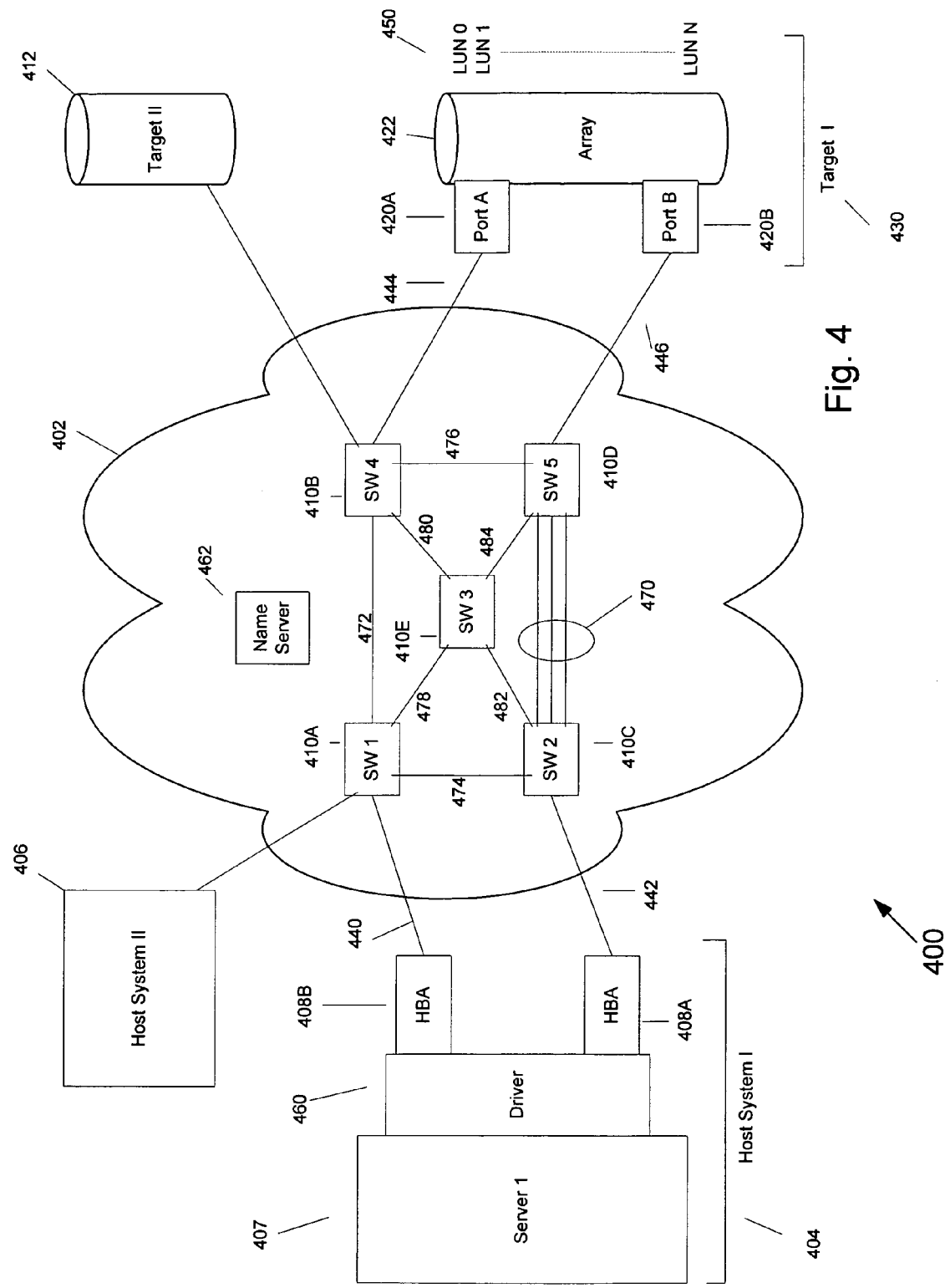
FIG. 4. illustrates one embodiment of a storage area network system with a multi-switch fabric, and a plurality of host systems and targets.

FIG. 4 illustrates one embodiment of a storage network system 400 with a multi-switch fabric 402, a first system 404, a second system 406, a second target 412 and a first target 430, which may comprise a storage array.

The switch fabric 402 comprises a plurality of switches 410A-410E. Two switches 410A, 410C of the fabric 402 are coupled to two HBAs 408B, 408A of the system 404 via links 440, 442, respectively. Switch 410A is also coupled to the second system 406.

Two other switches 410B, 410D of the fabric 402 are coupled to two ports A and B 420A, 420B of the first target storage array 430 via links 444 and 446, respectively. Switch 410B is also coupled to the second target 412.

The target storage array 430 may comprise a plurality of Logical Unit Number (LUN) devices 450, which are shown as LUN 0 to LUN N. This collection of LUNs form array 422. Each LUN may identify a storage device, such as a disk drive.

Fault Tolerance and Redundant Paths

The driver 103 in FIG. 1 allows a system administrator to set up one or more host bus adapters 104, 108 as fault tolerant data connections to a plurality of Fibre Channel devices 116-122. For example, host bus adapter 106 may be configured to provide a redundant path for devices 116-122. Each device 116-122 may have a plurality of ports to support redundant connections.

The driver 103 allows definition of paths 130A, 130B, 132A, 132B, 134A, 134B, 136A, 136B to storage devices 116-122. The redundant paths 130A, 130B, 132A, 132B, 134A, 134B, 136A, 136B, used in conjunction with the driver 103, make the system 100 tolerant to any single point of failure in the network. Fail over and fail back between paths may be handled entirely by the driver 103, and such activities may be totally transparent to any upper layer software module or application, such as the applications 214 (FIG. 2), 320 (FIG. 3).

The driver 103 may be operable to make use of multiple paths 130A-138B to multi-ported storage devices 116-122 within the system 100. "Path control" refers to the ability of the driver 103 to transmit and receive I/O operations via multiple paths to a single device, such as paths 130A and 130B to disk drive 116. The driver 103 may be configured with several fail over and fail back path control features, as described below.

When the driver 103 detects a problem on a primary path, "fail over" to a secondary path may be automatic. No operator or host system intervention, interruption, notification, involvement or burden may be required. The driver 103 routes I/O operations to the secondary path in response to the detected problem with the primary path. In addition, when the primary path returns, "fail back" to the primary path may also be automatic, and the driver 103 returns to sending I/O operations via the primary path.

The system 100 may use multiple topologies. In one embodiment, the driver 103 may be configured over switched fabrics or in another embodiment, the driver may be configured for hub-based loop topologies.

"1:N standby" refers to N multiple adapters, e.g., adapters 104, 108 in FIG. 1, which may be configured to use the same fail over adapter 106 in FIG. 1 as a redundant path. Thus, one additional adapter 106 in FIG. 1 may be added in the system 100 to provide fault tolerance and fail over capabilities for all other adapters. This feature may provide a cost efficient mechanism to provide fault tolerance for an entire storage subsystem 100.

A "1:1" standby means there is one standby adapter for each host bus adapter.

Load Balancing

In addition to or instead of providing a redundant path, the driver 103 (FIG. 1) may also provide load balancing between different paths 130A, 130B, 132A, 132B, 134A, 134B, 136A, 136B. "Load Balancing" is the ability to spread the traffic across multiple paths to a device. In one embodiment, the driver 103 may provide two different levels of load balancing: static balancing and dynamic balancing. In these two levels, each redundant path may not simply remain quiescent, but may be actively reducing the load of a primary path.

Static Balancing

Static balancing allows the driver 103 to be configured to allow specific paths for traffic. In addition, a "traffic ratio" may be specified for each path. The traffic ratio tells the driver 103 what percentage of data is to be sent over a primary path versus over a secondary path. For example, a traffic ratio of 2:1 means, 2 input/output operations (I/Os) are sent over the primary path for each I/O sent over the secondary path.

Dynamic Balancing

Dynamic balancing features built-in intelligence that allows the driver 103 to automatically select a path with the least congestion. The traffic conditions on all available paths, e.g., 130A-136B in FIG. 1, may be analyzed by the driver 103, based upon information known within the driver 103, the adapters 104, 106, 108 or the fabric switches or HUBs 110-114. As a result of this analysis, the driver 103 is able to ensure that the data is sent along the least congested path.

The different levels of load balancing, along with the traffic ratios in static balancing, may be configurable parameters. These parameters may be initialized during boot-up, but they may be dynamically changed on a live, running system. Thus, the administrator may configure one level of load balancing and dynamically change the level or the traffic ratio without requiring a reboot.

Paths and Routes

The driver 103 implements its fail over and load balancing features through the manipulation of two conceptual objects: Paths and Routes.

A "Path" is defined as a connection from a port in a host to a port in a target device. From the perspective of the driver 103, a Path is defined by a specific HBA (e.g., identified by a HBA ID number) (e.g., HBA 104), a specific port of a specific target device (e.g., port 130A), and a specific LUN on the target device. In order to ensure that a Path is correctly described when a system reboots, persistent binding may be employed. "Persistent binding" is a well-known characteristic of storage-related drivers that works with the operating system to ensure that a target and LUN combination is consistently identified across system reboots.

A "Route" for a device may be expressed in terms of:
  a primary path
  a plurality of secondary paths
  a traffic ratio setting
  flags and variables to enable and control specific behaviors Such Path and Route information must be made available to the driver 103. Such information may be entered by the user through the use a utility application. The utility application stores the information in either an operating-system-provided mechanism to register such data, or via a simple configuration file that is readable by the driver 103.

A "traffic ratio" flag may cause static load balancing across all Paths of a given Route. The traffic ratio "tr1:tr2: . . . :trN" means that "tr1" commands will be sent over the primary path for each "tr2" command sent over the first additional path, . . . , for each trN command sent over the N-1th additional path.

A "LUN queue" flag may cause dynamic load balancing based on the path's LUN queue depth. Such a setting may cause the driver 103 to maintain a queue for each Path in a Route where each queue contains the I/O operations destined for a particular LUN. The path with the lowest LUN queue depth may be selected for the I/O operation.

A "Target queue" flag may cause another type of dynamic load balancing. Such a setting may cause the driver 103 to maintain a queue for each Path in a Route where each queue contains the I/O operations destined for a particular Target. The path with the lowest target queue depth may be selected for the I/O operation.

An "HBA queue" flag may cause another type of dynamic load balancing. Such a setting may cause the driver 103 to maintain a queue for each Path in a Route where each queue contains the I/O operations destined for a particular HBA. The Path with the lowest HBA queue depth may be selected for the I/O operation.

An "Auto Fail Back" flag may cause fail back to the primary path to happen automatically. If this flag is not set, fail back may require intervention by an application issuing the appropriate command to the driver 103.

An "Inquiry Validate" flag may activate an "Inquiry Validation" feature when a login session is established with a remote device (e.g., Disk 116 of FIG. 1). This feature may cause each Path in a Route to issue an "Inquiry" command to the remote device at a configuration time. The unique device identifier from all the Inquiries on each Path must match for all Paths of a Route before the Route is activated.

A "Heartbeat" flag may activate the "Inquiry Validate" feature every 60 seconds on each Path.

A "Linkdown Timeout" variable may determine how long the driver 103 may wait (e.g., 1 to 255 seconds) before declaring that a Path has failed. I/O operations waiting to be serviced for that path may be aborted and subsequently restarted on a secondary Path for the same Route.

The lower the Linkdown Timeout value, the quicker the driver 103 will fail over to the secondary Path. There may be tradeoffs, however. Small values of Linkdown Timeout may risk "thrashing" between Paths if the primary path is intermittent. Large values of Linkdown Timeout may hold I/O operations so long that upper layer software modules (e.g., 210-214 in FIG. 2 and 302, 318, and 320 in FIG. 3) may themselves time out and initiate error recoveries that could disrupt the activities of the driver 103. Providing an adjustable value for Linkdown Timeout allows an appropriate value to be set on a per-system basis.

Usage Extensions

One usage extension is for the driver 103 to make use of explicit knowledge of the remote storage devices 116-122. Many storage devices accept commands to determine which LUNs are accessible from which ports. For example, if the driver 103 knows these commands for the storage device 116, the driver 103 could issue commands to the device 116 that would allow access to a desired LUN via ports 130A and 130B. This would ensure that the driver 103 had two redundant paths available to access the selected LUN.

A further usage extension involves Application Program Interfaces (APIs) 216 (FIG. 2) and 324 (FIG. 3) that enable application-specific storage management applications 218 (FIG. 2) and 322 (FIG. 3) to "control" the driver 103 functionality. Examples of management applications may include an Oracle or Microsoft (MS) Exchange "application-centric" storage resource management application. Examples may include storage management applications that control large databases or E-mail systems or the like. Such a management application has detailed knowledge of the storage and availability needs of its application. With such knowledge in hand, the management application 218, 322 may be able to optimize the behavior of the driver 202 (FIG. 2), 302 (FIG. 3). Thus, the access provided by the APIs 216, 324 allows these management applications 218, 322 to tailor fail over and load balancing to best suit the needs of the applications they support.

Another possible usage extension is an API 216 (FIG. 2) or 324 (FIG. 3) that supports system-level high-availability (HA) applications. Examples of high-availability systems today may include Veritas' DMP, PowerPath, ATF or Compaq's SecurePath. Such applications 218 (FIG. 2) or 322 (FIG. 3) manage storage for systems that demand high reliability. While such applications generally know how to manage the host system, and often the target as well, they have little knowledge of, and less control over the network that connects the host system to its storage. The HBAs and drivers described above, coupled with an API 216, 324, may be able to give additional intelligence and performance to such HA applications 218, 322.

For example, such an application 218, 322 may obtain network status information via the API 216, 324 (throughput/performance, queue depths, error information, etc.), which would not otherwise be available to the application 218, 322. The application 218, 322 may be able to issue commands via the API 216, 324 to cause the above-mentioned drivers and HBAs to fail over, fail back, etc.

Another possible usage extension is Fabric/Switch routing feedback. A fabric switch 110-114 may provide load balancing or pathing feedback to the driver 103 based on path congestion, path performance (throughput, utilization or latency), and path failures.

A switch such as switch 110 may communicate with a driver through Fibre Channel Extended Link Services (ELS) commands. In another implementation, Fibre Channel Common Transport (CT) commands may be used to facilitate communication between the switch 110 and the HBA 104. Authentication and security may be added. The system may be operable to initiate CT traffic.

FIG. 4. Fabric Operation

FIG. 4 illustrates one embodiment of a storage area network system 400 with a multi-switch fabric 402, and a plurality of host systems 404, 406 and targets 412, 430.

The HBA driver 460 of the subsystem 400 of FIG. 4 may have multiple basic modes of operation, such as fail over/fail back and load balancing. Load balancing may include static and dynamic load balancing as described herein.

For bi-directional paths, separate load balancing for each direction in a single path may be provided.

In FIG. 4, there may be four separate paths from the Host System I 404 to the Target I 430, with each path defining a bi-directional signal propagation path between a host bus adapter (HBA) 408A, 408B of the Host System I 404 to a port 420A, 420B of the Target I 430. These paths may be described as follows:

Path A: Link 440 to Link 444
Path B: Link 440 to Link 446
Path C: Link 442 to Link 444
Path D: Link 442 to Link 446

Inside the fabric 402, each path may traverse a variety of inter-switch links (ISLs) 470-484. The switches 410A-410E determine the internal transmission of data within the fabric 402, and without communication between the HBA driver 460 and the fabric 402. The HBA driver 460 is only concerned with the end-point links 440-446.

From the point of view of the operating system in the Server 407, there may be no awareness of the different paths selected by the HBA driver 460. In fact, the driver 460 may only identify the requested device (a desired LUN out of the LUNs 450) by the default path, and it is up to the HBA driver 460 to select the actual path(s) that will be used.

Fail Over/Fail Back

In 1:1 or standby mode, the HBA driver 460 may use well-known Fibre Channel discovery processes to identify which paths are able to reach Target I 430. As described above with FIG. 4, paths A, B, C, or D are available. The HBA driver 460 may then select (or allow a user to select) one path as the default, and select one or more additional paths as standby paths. For example, path A may be the default path, and paths B, C and D may be the secondary paths.

If one of the HBAs 408A, 408B detects a link down (loss of signal) or receives a remote state change notification (RSCN) indicating failure on another link, the HBA 408A, 408B will pass this information to the HBA driver 460. Upon receiving this information, the HBA driver 460 may automatically fail over by aborting all current I/O operations on the affected path and restarting them and all subsequent I/O operations on a secondary path. Similarly, a failure on the secondary path may cause the HBA driver 460 to fail over to a third path. The HBA driver 460 may do so without the loss of data, and without the necessity of communicating the problem to the operating system on the server 407.

If the HBA driver 460 receives an RSCN from the fabric 402, the HBA driver 460 may request a report from a nameserver 462 in the fabric 402 in order to determine which path has been affected. If the link down is repaired, or another RSCN is received indicating that the affected path is back in service, then the HBA driver 460 may fail back by returning to the prior path.

This automatic switchover to and from a secondary path, without the necessity of communicating a problem to the operating system, is different from prior fail over methods. Prior fail over methods do not comprise a means for an HBA to report the link down or RSCN back to a fail over system. Such fail over systems must infer that such events have occurred after a timeout failure of a pending I/O, and require that the lost data be resent by the operating system, which further adds to the delay.

Static Load Balancing

The subsystem 400 is also capable of load balancing in a variety of modes. The simplest may be a fixed balance called static balancing. The HBA driver 460 first determines the available paths as described above and presents this information to the human operator. The operator selects the relative percentage (traffic ratio) of message traffic that should be sent on each path. This traffic ratio may remain fixed over time until changed again by the human operator.

If a link goes down or an RSCN is received relating to a specific path, then the HBA driver 460 automatically redirects the traffic onto the remaining path(s) available for communications between the particular host system, e.g., Host System I 404, and a target, e.g., Target I 430. In the present system, the Host System I 404 may behave as if it is sending information on a single path (the default path). But the HBA Driver 460 may be selectively redirecting data down the other pre-selected pathways without requiring host intervention.

Dynamic Load Balancing

Instead of a simplified method of fixed load balancing, the HBA driver 460 may use its own internal information about activity on the various paths to determine ways to optimize load balancing. The HBA driver 460 may maintain internal queues or pointers to queues for communications on each path. The HBA driver 460 may use "LUN queue," "Target queue," or "HBA queue" types of dynamic load balancing, as described above. The driver 460 may compare the queue sizes to determine optimal load balancing.

The HBA driver 460 may allow the human operator to select between which algorithm of load balancing is used.

Fabric Input

The fabric 402 in FIG. 4 may contain five storage area network switches 410A-410E, such as those made by Brocade. Such switches 410A-410E control the routing of communications inside the fabric 402 between the switches 410A-410E. Such switches 410A-410E may monitor the activity levels of the communications and may be modified to provide information to the HBA driver 460.

One mode for such information may be for Initial Setup Path Weighting, in which the switches 410A-410E may report on the relative bandwidth capacity for handling communications between the switches 410A-410E (such as the three trunks 470 between switch 2 410C and switch 5 410D in FIG. 4). This reporting may allow the HBA driver 460 to automatically set a fixed traffic ratio based on the information from the switches 410A-410E in the fabric 402, without requiring human operator intervention.

The switches 410A-410E in the fabric 402 may also provide Path Alerts and Congestion Reports as information to the HBA driver 460. The HBA driver 460 may register the paths it uses with the fabric 402, and issue requests to the fabric 402 for Path Alerts and Congestion Reports. The fabric 402 would then provide such alerts and reports when predetermined conditions are met, such as a timeout or congestion level exceeding a predetermined threshold.

A Path Alert would indicate a significant change in the ability of a path to support I/O. An example of a Path Alert may be the loss of Inter Switch Link (ISL) 472. Although the fabric 402 could reroute I/Os via paths 478 and 480, this would require an extra "hop," which would increase the latency of any data sent via that path. Thus, a Path Alert may cause the HBA driver 460 to fail over to another path, or make a change in load balancing.

A Congestion Report allows the fabric 402 to inform the driver 460 of excessive congestion in a given segment of a path. The HBA driver 460 may then automatically change the selected path, or adjust the load balancing to favor a more efficient path.

As a further variation, the decision-making procedure (of selecting paths and changing paths) could be moved to the fabric 402. For example, fail over and load balancing decisions may be made by software in the fabric 402, and communicated as commands (for path selection, redirection, load balancing, etc.) to the HBA driver 460.

The information and commands communicated between the fabric 402 and the HBA driver 460 may be in-band signals in the FC network. Alternatively, the data and commands may be out-of-band signals, e.g., they may be sent over a separate Ethernet connection between the fabric 402 and the Host System I 404.

Control of Separate Directions in Bi-directional Paths

Fibre Channel protocol allows two independent communications signals to propagate in opposite directions on a single path. It is possible that there may be congestion in one direction, but not in the other direction, for a single path. Each of the methods described above for load balancing may be operated in order to treat the two directions on each path separately.

For example, in FIG. 4, the Host system II 406 could be sending large quantities of data to the Target II 412 through the fabric 402, which may be likely to cause congestion on the link 444, but only in one direction. This leaves the return direction of these links uncongested, and available for communications from Target I 430 to Host system I 404. The level of congestion on the paths is not likely to be directionally symmetric. Each of the techniques described above may be used to separately consider each of the directions for each path in making improved load balancing adjustments.

In summary, some of the features described above include:

1) An operating system residing on a Host System 404 may use a single device identifier in the same way as previously used by an operating system to specify the path. But the HBA driver 460 and HBAs 408A, 408B may cause communications on the path to be automatically redirected to one or more alternative paths, without a loss of data, to support fail over/fail back or load balancing.

2) Queuing activity inside the HBA driver 460 may be used to dynamically set the degree of load balancing in response to changing conditions.

3) The fabric sensing of activity levels by storage area network switches 410A-410E can be used to either provide information to (a) the HBA driver 460 in order to control fail over/fail back or load balancing; or (b) software in the fabric 402. In the latter case, the switches 410A-410E themselves may determine appropriate paths. Such appropriate paths may be communicated to the HBA driver 460.

4) The bi-directional FC paths in FIG. 4 may have each direction separately and independently controlled for load balancing.

5) In a Fibre Channel storage area network (SAN), where multiple paths exist to a storage device (e.g., one of the LUNs 450), the HBA driver 460 may utilize input from the fabric 402 to determine the best path to send an I/O request.

6) In a Fibre Channel environment, where multiple paths exist to a storage device, the HBA driver 460 may utilize its queue depth information to determine the best path to send an I/O request.

7) The systems described above may be tailored for use with Fibre Channel and iSCSI networks, but may be used with other storage area networks.

In one embodiment, an administrator may do "live" system firmware upgrades with the described system by bringing down an HBA using either a 1:N or a 1:1 fail over. The firmware can be upgraded and reloaded on the HBA while the secondary HBA temporarily handles its I/O traffic. After the firmware download is complete, fail back can be employed to return traffic to the primary adapter. This allows system upgrades to occur without impacting system availability.

Figure 5:
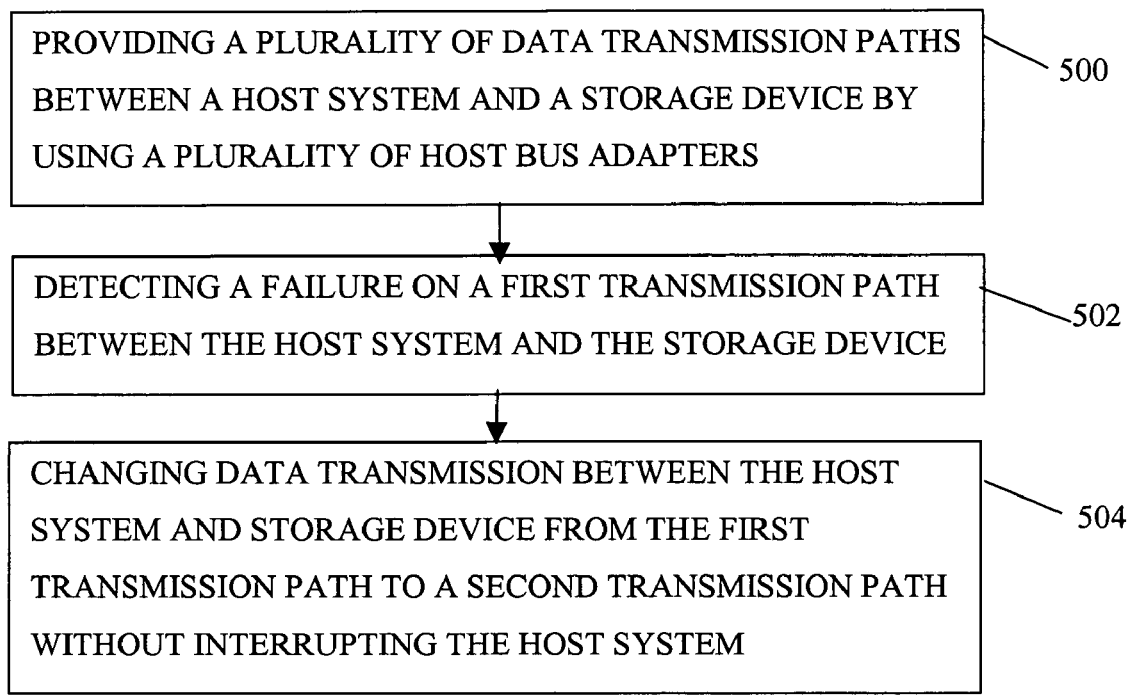
FIG. 5 illustrates a method of transmitting data.

FIG. 5 illustrates a method of transmitting data using one of the systems in FIGS. 1-4. In a block 500, the method provides a plurality of data transmission paths between a host system and a storage device by using a plurality of host bus adapters. In a block 502, the method detects a failure on a first transmission path between the host system and the storage device. In a block 504, the method changes data transmission between the host system and storage device from the first transmission path to a second transmission path without interrupting the host system.

Figure 6:
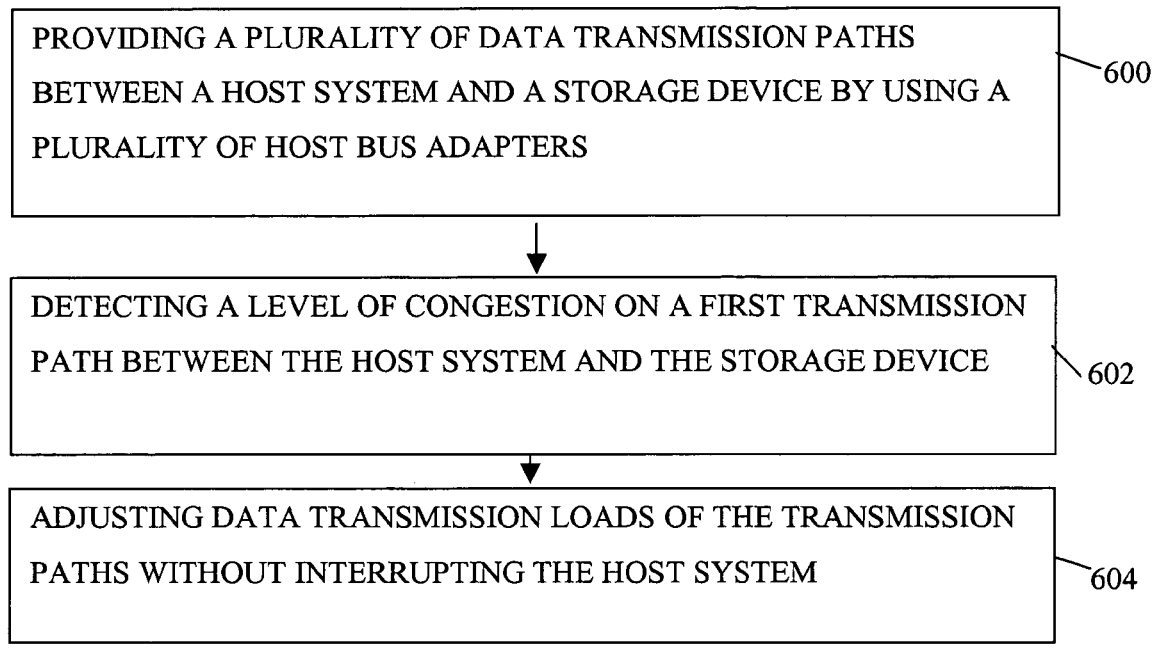
FIG. 6 illustrates another method of transmitting data.

FIG. 6 illustrates another method of transmitting data using one of the systems in FIGS. 1-4. In a block 600, the method provides a plurality of data transmission paths between a host system and a storage device by using a plurality of host bus adapters. In a block 602, the method detects a level of congestion on a first transmission path between the host system and the storage device. In a block 604, the method adjusts data transmission loads of the transmission paths without interrupting the host system.

A number of embodiments have been described. Nevertheless, it will be understood that various modifications may be made. Accordingly, other embodiments are within the scope of the following claims.

What is claimed is:

1. A system comprising:
an operating system;
a driver in communication with the operating system; and
a plurality of host bus adapters in communication with the driver, the host bus adapters providing a plurality of data transmission paths between the operating system and a plurality of storage arrays, each storage array containing a plurality of ports and a plurality of logical unit number (LUN) storage devices;
wherein the driver is operable to receive a remote state change notification (RSCN) from one of the host bus adapters indicating a failure in one of the data transmission paths and automatically fail over by aborting all current input/output operations and restarting them on a secondary path without burdening the operating system.

2. The system of claim 1, wherein the driver is operable to receive an RSCN from one of the host bus adapters indicating a repair of the previously failing data transmission path and change data transmission from the secondary path to the previously failing path without notifying the operating system.

3. The system of claim 1, wherein the host bus adapters are operable to communicate with the plurality of storage arrays via a plurality of Fibre Channel switches.

4. The system of claim 1, wherein the host bus adapters are operable to communicate with the plurality of storage arrays via a plurality of Fibre Channel hubs.

5. The system of claim 1, wherein the host bus adapters are operable to communicate with the plurality of storage arrays via a Fibre Channel fabric.

6. The system of claim 1, wherein the host bus adapters communicate with the plurality of storage arrays via an Internet Small Computer System Interface (iSCSI) link.

7. The system of claim 1, wherein the host bus adapters are Internet Small Computer System Interface (iSCSI) host bus adapters.

8. The system of claim 1, further comprising a fabric of switches operable to transfer data between the host bus adapters and the plurality of storage arrays via the plurality of data transmission paths.

9. The system of claim 1, wherein the system is operable to receive live system firmware upgrades at a host bus adapter without burdening the operating system.

10. The system of claim 1, wherein the driver is operable to abort an input/output command after a link between a host bus adapter and a particular LUN storage device is not functioning properly for a pre-determined amount of time.

11. The system of claim 1, wherein the driver is operable to abort an input/output command after a particular LUN storage device ceases to communicate with the host bus adapters for a pre-determined amount of time.

12. The system of claim 1, wherein the driver is operable to receive a remote state change notification and request information of a malfunctioning data transmission path.

13. The system of claim 1, wherein the driver is operable to control data transmission in one direction on each data transmission path independently of data transmission in another direction on the data transmission path.

14. The system of claim 1, wherein the driver changes data transmission paths without losing data.

15. The system of claim 1, wherein the operating system comprises a software application, an operating system file system and an operating system Small Computer System Interface (SCSI) driver.

16. The system of claim 1, further comprising a management application operable to send commands to the driver.

17. The system of claim 1, further comprising an application program interface between the management application and the driver.

18. The system of claim 1, wherein the driver is further operable to receive a remote state change notification (RSCN) from one of the host bus adapters indicating a data transmission condition in one of the data transmission paths and automatically adjust data transmission loads of the data transmission paths by redirecting traffic on the data transmission paths without burdening the operating system.

19. The system of claim 18, wherein the driver is operable to adjust data transmission loads of data transmission paths in a first direction from the operating system to the plurality of storage arrays independent of adjusting transmission loads of data transmission paths in a second direction from the plurality of storage arrays to the operating system.

20. The system of claim 18, wherein the driver adjusts data transmission loads without losing data.

21. The system of claim 18, wherein the operating system identifies a particular storage array for an input/output command, the driver selects one data transmission path among the plurality of data transmission paths based on a condition of the data transmission paths, the driver sending the input/output command on the selected data transmission path.

22. The system of claim 18, further comprising a Fibre Channel port driver between the driver and a host bus adapter, the Fibre Channel port driver being operable to process requests as Fibre Channel commands for the host bus adapter.

23. The system of claim 18, further comprising a management application operable to send commands to the driver.

24. The system of claim 18, wherein the driver is operable to adjust a data transmission load from an active data transmission path to an inactive data transmission path without burdening the operating system.

25. The system of claim 18, wherein the driver is operable to switch input/output operations from one host bus adapter to another host bus adapter.

26. The system of claim 18, wherein the driver is operable to switch input/output operations from a host bus adapter in a set of host bus adapters to a standby host bus adapter.

27. The system of claim 18, wherein the driver is operable to configure a first ratio of data transmission load for a first data transmission path and a second ratio of data transmission load for a second data transmission path.

28. The system of claim 27, wherein the data transmitted comprises input/output operations.

29. The system of claim 18, wherein the driver allows an operator to configure a first data transmission load on a first data transmission path and a second data transmission load on a second data transmission path while the system is operating.

30. The system of claim 18, wherein the driver is operable to increase a data transmission load of one data transmission path after detecting at least one data traffic condition on another data transmission path without notifying the operating system.

31. The system of claim 30, wherein the data transmitted comprises input/output operations.

32. The system of claim 18, wherein the driver is operable to increase a data transmission load of one data transmission path that transmits data to fewer storage arrays than another data transmission path without notifying the operating system.

33. The system of claim 18, wherein the driver is operable to increase a data transmission load of one data transmission path coupled to a first storage array that has a lower number of intended input/output operations than a second storage array coupled to another data transmission path without notifying the operating system.

34. The system of claim 33, wherein the driver maintains queues of intended input/output operations for the first and second storage arrays.

35. The system of claim 18, wherein the driver is operable to increase a data transmission load of one data transmission path associated with a host bus adapter that has less pending commands than another host bus adapter associated with another data transmission path.

36. The system of claim 35, wherein the driver maintains queues of intended input/output operations for the host bus adapters.

37. The system of claim 18, wherein the driver is operable to increase a data transmission load of one data transmission path that is coupled to a target port with less pending input/output commands than another target port coupled to another data transmission path without burdening the operating system.

38. The system of claim 37, wherein the driver maintains queues of intended input/output operations for the target ports.

39. The system of claim 18, wherein the driver is operable to track levels of data transmission on each data transmission path.

40. The system of claim 18, wherein the system is operable to receive live system firmware upgrades at a host bus adapter without burdening the operating system.

41. The system of claim 18, wherein the driver allows an operator to select between a plurality of modes while the system is running:
in a first mode, the driver is operable to adjust a data transmission load from an active data transmission path to an inactive data transmission path without burdening the operating system;
in a second mode, the driver is operable to set a first data transmission load on a first data transmission path and a second data transmission load on a second data transmission path; and
in a third mode, the driver is operable to increase a data transmission load of one data transmission path after detecting a data traffic condition on another data transmission path without burdening the operating system.

42. The system of claim 41, wherein each data transmission path has a flag that specifies whether the data transmission path is configured in the first, second or third mode.

43. The system of claim 42, wherein the driver is operable to adjust data transmission loads of the plurality of data transmission paths to the plurality of storage arrays depending on a number of intended input/output commands for each storage array.

44. The system of claim 18, wherein the driver is operable to receive a data transmission condition from a fabric of switches coupled between the host bus adapters and the plurality of storage arrays, wherein the driver uses the condition to adjust data transmission loads of the plurality of data transmission paths without burdening the operating system.

45. The system of claim 44, wherein the condition comprises communication capacity levels between a plurality of switches in the fabric.

46. The system of claim 44, wherein the driver uses the communication capacity levels to set data transmission ratios for the data transmission paths.

47. The system of claim 44, wherein the condition comprises an alert of a data transmission path with a change in ability to transfer input/output operations.

48. The system of claim 44, wherein the condition comprises a report of congestion on a data transmission path.

49. The system of claim 44, wherein the condition comprises a data transmission path selected by a switch within the fabric of switches.

50. A computer readable medium comprising computer executable instructions, the computer executable instructions comprising a software driver configured to be in communication with an operating system and a plurality of host bus adapters, the host bus adapters providing a plurality of data transmission paths between the operating system and a plurality of storage arrays, each storage array containing a plurality of ports and a plurality of logical unit number (LUN) storage devices, the driver being operable to receive a remote state change notification (RSCN) from one of the host bus adapters indicating a failure in one of the data transmission paths and automatically fail over by aborting all current input/output operations and restarting them on a secondary path without burdening the operating system.

51. The computer readable medium of claim 50, wherein the software driver comprises a Fibre Channel Protocol host bus adapter driver module and a fail over driver module.

52. The computer readable medium of claim 50, wherein the software driver comprises a Small Computer System Interface (SCSI) host bus adapter driver module and a fail over driver module.

53. The computer readable medium of claim 50, wherein the software driver is operable to receive commands from a management application.

54. A computer readable medium comprising computer executable instructions, the computer executable instructions comprising a software driver configured to be in communication with an operating system and a plurality of host bus adapters, the host bus adapters providing a plurality of data transmission paths between the operating system and a plurality of storage arrays, each storage array containing a plurality of ports and a plurality of logical unit number (LUN) storage devices, wherein the driver is operable to receive a remote state change notification (RSCN) from one of the host bus adapters indicating a data transmission condition in one of the data transmission paths and automatically adjust data transmission loads of the data transmission paths by redirecting traffic on the data transmission paths without burdening the operating system.

55. The computer readable medium of claim 54, wherein the software driver comprises a Fibre Channel Protocol host bus adapter driver module and a load balancing driver module.

56. The computer readable medium of claim 54, wherein the software driver comprises a Small Computer System Interface (iSCSI) host bus adapter driver module and a load balancing driver module.

57. The computer readable medium of claim 54, wherein the software driver is operable to receive commands from a management application.

58. A switch fabric coupled to a plurality of host bus adapters of an operating system and to a plurality of storage arrays of a target system, each storage array containing a plurality of ports and a plurality of logical unit number (LUN) storage devices, the switch fabric comprising a plurality of switches, the switch fabric being operable to detect a data transmission condition and send a remote state change notification (RSCN) to a software driver, and further operable to automatically adjust a data transmission load on at least one path between the driver and ports of the target system in response to the software driver without burdening the operating system.

59. The switch fabric of claim 58, wherein the switches are Fibre Channel switches.

60. The switch fabric of claim 58, further comprising inter-switch links between a plurality of switches.

61. The switch fabric of claim 58, wherein the switches communicate with the driver through Fibre Channel Extended Link Services commands.

62. The switch fabric of claim 58, wherein the switches communicate with the driver through Fibre Channel Common Transport commands.

63. A method of transmitting data, the method comprising:

providing a plurality of data transmission paths between a plurality of host bus adapters of an operating system and a plurality of storage arrays, each storage array containing a plurality of ports and a plurality of logical unit number (LUN) storage devices;

determining which data transmission paths are available by sending a command to a particular storage array to determine which LUN storage devices are accessible through which of the plurality of ports on that storage array;

receiving a remote state change notification (RSCN) from one of the host bus adapters indicating a failure in one of the data transmission paths; and automatically failing over by aborting all current input/output operations and restarting them on a secondary path without burdening the operating system.

64. A method of transmitting data, the method comprising:

providing a plurality of data transmission paths between an operating system and a plurality of storage arrays, each storage array containing a plurality of ports and a plurality of logical unit number (LUN) storage devices, by using a plurality of host bus adapters;

determining which data transmission paths are available by sending a command to a particular storage array to determine which LUN storage devices are accessible through which of the plurality of ports on that storage array;

receiving a remote state change notification (RSCN) from one of the host bus adapters indicating a data transmission condition in one of the data transmission paths; and automatically adjusting a data transmission load of the data transmission paths by redirecting traffic in the remaining data transmission paths without burdening the operating system.

65. The method of claim 64, wherein the data transmission condition is a number of input/output operations destined for a particular port in a particular storage array.

66. The method of claim 64, wherein the data transmission condition is a number of input/output operations destined for a particular storage device.

67. The method of claim 64, wherein the data transmission condition is a number of input/output operations destined for a particular host bus adapter.

68. A system comprising:

an operating system;

a driver in communication with the operating system;

a plurality of host bus adapters in communication with the driver, the host bus adapters providing a plurality of data transmission paths between the operating system and a plurality of storage devices, each storage device comprising a plurality of ports;

a first application which accesses the storage devices through the operating system and the driver; and a management application distinct from the first application and the operating system, wherein the driver is operable to change data transmission from a primary path to a secondary path without burdening the operating system or the first application, and the management application controls the manner in which the driver processes communications between the first application and the storage devices without burdening the operating system.

69. The system of claim 68 further comprising an API which connects the management application to the driver.

70. The system of claim 68, wherein the management application is designed according to detailed knowledge of the storage and availability needs of the first application in order to optimize the behavior of the driver.

* * * * *